US008744484B2

(12) United States Patent
Do et al.

(10) Patent No.: US 8,744,484 B2
(45) Date of Patent: Jun. 3, 2014

(54) WIRELESS NETWORK COVERAGE ESTIMATION USING DOWN-SAMPLED CROWD-SOURCED DATA

(75) Inventors: Ju-Yong Do, Palo Alto, CA (US); Gengsheng Zhang, Cupertino, CA (US); Weihua Gao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 13/557,154

(22) Filed: Jul. 24, 2012

(65) Prior Publication Data

US 2014/0031055 A1 Jan. 30, 2014

(51) Int. Cl.
*H04W 24/00* (2009.01)
(52) U.S. Cl.
USPC .................................................. 455/456.1
(58) Field of Classification Search
USPC ............. 455/457, 456.1, 422.1, 575.9, 456.2, 455/456.3, 556.1, 313, 435.1; 370/331, 370/252, 335; 375/240.03, 219; 348/699, 348/607
See application file for complete search history.

(56) References Cited

U.S. PATENT DOCUMENTS

| | | | |
|---|---|---|---|
| 6,198,927 B1 * | 3/2001 | Wright et al. ............... | 455/435.1 |
| 2003/0235164 A1 * | 12/2003 | Rogers et al. ................. | 370/331 |
| 2006/0067275 A1 | 3/2006 | Yang et al. | |
| 2009/0175189 A1 * | 7/2009 | Alizadeh-Shabdiz et al. ............................ | 370/252 |
| 2011/0081023 A1 * | 4/2011 | Raghuvanshi et al. ......... | 381/17 |
| 2011/0176494 A1 | 7/2011 | Huang et al. | |
| 2011/0176523 A1 | 7/2011 | Huang et al. | |
| 2011/0177831 A1 * | 7/2011 | Huang ........................... | 455/457 |
| 2011/0306365 A1 | 12/2011 | Wirola et al. | |
| 2012/0142302 A1 * | 6/2012 | Wu et al. ....................... | 455/313 |

FOREIGN PATENT DOCUMENTS

WO   WO 2005/004527   1/2005

OTHER PUBLICATIONS

3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 11), 3GPP Standard; 3GPP TS 37.320, 3rd Generation Partnership Project (3GPP), Mobile Competence Centre ; 650, Route Des Lucioles ; F-06921 Sophia-Antipolis Cedex ; France, vol. RAN WG2, No. V11.0.0, Jun. 26, 2012, pp. 1-20, XP050581133, [retrieved on Jun. 26, 2012].
Connelly K., et al., "A Toolkit for Automatically Constructing Outdoor Radio Maps", Information Technology: Coding and Computing, 2005, ITCC, International Conference on Las Vegas, NV, USA Apr. 4-6, 2005, Piscataway, NJ, USA, IEEE, vol. 2, Apr. 4, 2005, pp. 248-253, XP010795323, ISBN: 978-0-7695-2315-6.
International Search Report and Written Opinion—PCT/US2013/050957, International Search Authority—European Patent Office, Dec. 9, 2013.

(Continued)

*Primary Examiner* — Kiet Doan
(74) *Attorney, Agent, or Firm* — Mahamedi Paradice Kreisman LLP

(57) ABSTRACT

A method of estimating wireless network coverage includes receiving location data from a plurality of mobile devices located within range of an antenna in a wireless network. The location data is mapped onto a grid of districts and down-sampled for respective districts of the grid. An approximate coverage region of the antenna is calculated based at least in part on the down-sampled location data.

20 Claims, 9 Drawing Sheets

★ Representative Location 208
· Crowd-sourced location 210

(56) References Cited

OTHER PUBLICATIONS

Mankowitz J.D., et al., "Mobile device-based cellular network coverage analysis using crowd sourcing", EUROCON—International Conference on Computer As a Tool (EUROCON), 2011 IEEE, Apr. 27-29, 2011, Lisbon Portugal, IEEE, Piscataway, NJ, Apr. 27, 2011, pp. 1-6, XP032151690, DOI:10.1109/EUROCON.2011.5929420 ISBN: 978-1-4244-7486-8.

Mediatek Inc: "UL Measurements for MDT UL Coverage Use Case in LTE", 3GPP Draft; R1-120620 UL Measurements for MDT UL Coverage Use Case in LTE, 3rd Generation Partnership Project (3GPP), Mobile Competence Centre ; 650, Route Des Lucioles ; F-06921 Sophia-Antipolis Cedex ; France, vol. RAN WG1, No. Dresden, Germany; 20120206-20120210, Jan. 31, 2012, 3 pages, XP050563035, [retrieved on Jan. 31, 2012].

NEC: Accuracy of location information in MDP, 3GPP Draft; R2-103543, 3rd Generation Partnership Project (3GPP), Mobile Competence Centre ; 650, Route Des Lucioles ; F-06921 Sophia-Antipolis Cedex ; France, vol. RAN WG2, No. Stockholm, Sweden; Jun. 28, 2010, Jun. 22, 2010, 3 pages, XP050451119, [retrieved on Jun. 22, 2010].

Neidhardt E., et al., "Estimating locations and coverage areas of mobile network cells based on crowdsourced data", Wireless and Mobile Networking Conference (WMNC), 2013 6th Joint IFIP, IEEE, Apr. 23, 2013, pp. 1-8, XP032432272, DOI: 10.1109/WMNC.2013.6549010 ISBN: 978-1-4673-5615-2.

\* cited by examiner

★ Representative Location 208
· Crowd-sourced location 210

★ Representative Location 208
• Crowd-sourced location 210

WIRELESS NETWORK COVERAGE ESTIMATION USING DOWN-SAMPLED CROWD-SOURCED DATA

TECHNICAL FIELD

The present embodiments relate generally to wireless networks, and specifically to estimating coverage in wireless networks.

BACKGROUND OF RELATED ART

A wireless network service provider (e.g., a cellular service provider) or other party may maintain a database of estimated coverage regions (e.g., estimated cell coverage regions). Coverage regions may be estimated using data from multiple sources. For example, mobile device data used to estimate coverage regions may be crowd-sourced.

There are security challenges associated with using crowd-sourced data. For example, a hostile mobile device may repeatedly broadcast bogus location data in an attempt to fool the service provider's system. Storing data regarding known locations of numerous mobile devices raises privacy concerns and may consume a large amount of memory. Furthermore, processing a large amount of mobile-device location data is computationally intensive.

Accordingly, there is a need for secure and efficient ways to use crowd-sourced data to estimate coverage regions.

BRIEF DESCRIPTION OF THE DRAWINGS

The present embodiments are illustrated by way of example and are not intended to be limited by the figures of the accompanying drawings.

Like reference numerals refer to corresponding parts throughout the drawings and specification.

DETAILED DESCRIPTION

Figure 1:
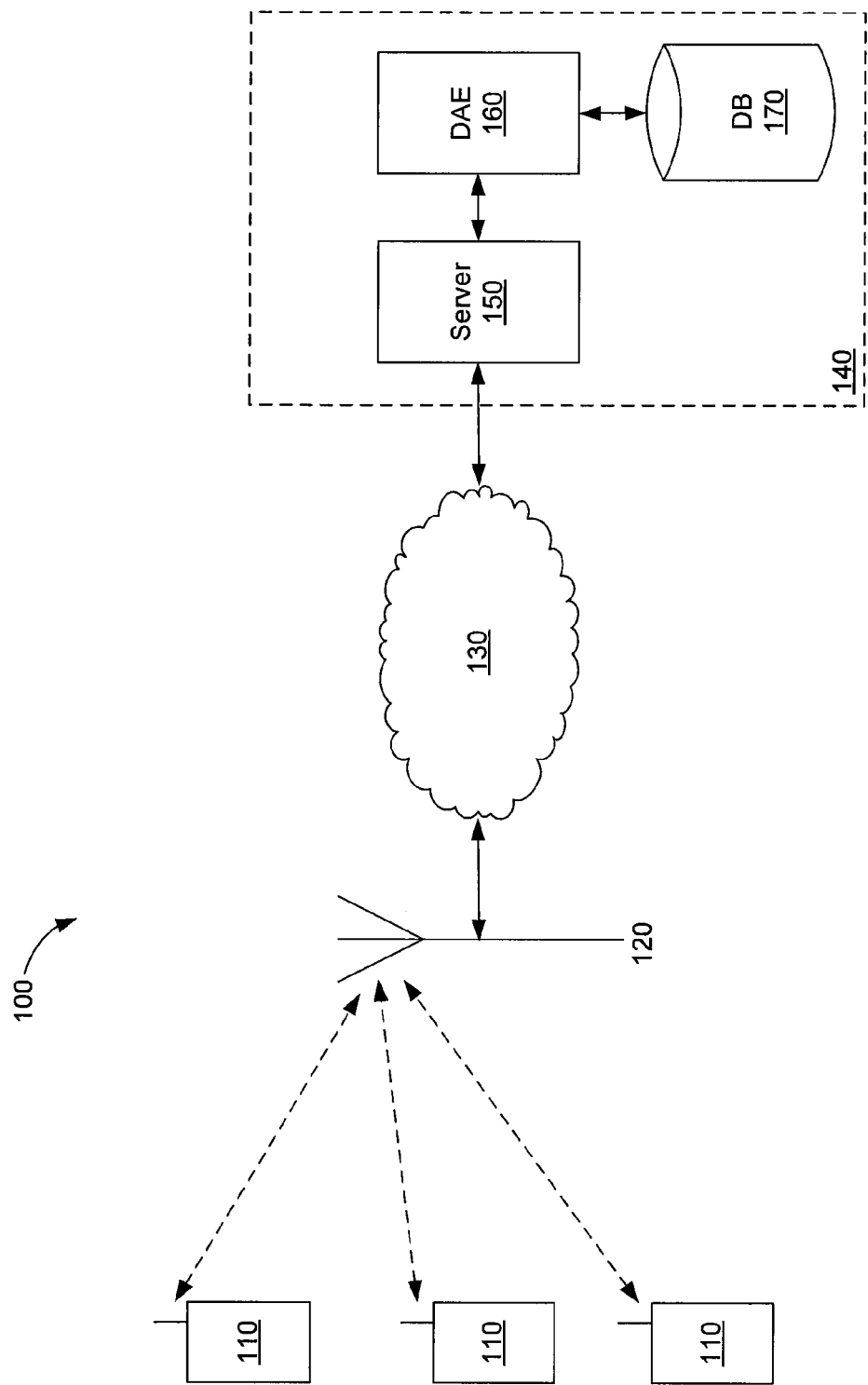
FIG. 1 is a diagram of a network in which location data is collected from a plurality of mobile devices in accordance with some embodiments.

Embodiments are disclosed in which a coverage region associated with an antenna in a wireless network is approximated using crowd-sourced, down-sampled location data.

In some embodiments, a method of estimating wireless network coverage includes receiving location data from a plurality of mobile devices located within range of an antenna in a wireless network. The location data is mapped onto a grid of districts and down-sampled for respective districts of the grid. An approximate coverage region of the antenna is calculated based at least in part on the down-sampled location data.

In some embodiments, a computer system includes a network interface to receive location data from a plurality of mobile devices located within range of an antenna in a wireless network. The computer system also includes one or more processors and memory storing one or more programs configured to be executed by the one or more processors. The one or more programs include instructions to map the location data onto a grid of districts, instructions to down-sample the location data for respective districts of the grid, and instructions to calculate an approximate coverage region of the antenna based at least in part on the down-sampled location data.

In some embodiments, a non-transitory computer-readable storage medium stores one or more programs configured to be executed by a computer system that includes one or more processors. The one or more programs include instructions to map location data from a plurality of mobile devices located within range of an antenna in a wireless network onto a grid of districts, instructions to down-sample the location data for respective districts of the grid, and instructions to calculate an approximate coverage region of the antenna based at least in part on the down-sampled location data.

In the following description, numerous specific details are set forth such as examples of specific components, circuits, and processes to provide a thorough understanding of the present disclosure. Also, in the following description and for purposes of explanation, specific nomenclature is set forth to provide a thorough understanding of the present embodiments. However, it will be apparent to one skilled in the art that these specific details may not be required to practice the present embodiments. In other instances, well-known circuits and devices are shown in block diagram form to avoid obscuring the present disclosure. The term "coupled" as used herein means connected directly to or connected through one or more intervening components or circuits. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The present embodiments are not to be construed as limited to specific examples described herein but rather to include within their scopes all embodiments defined by the appended claims.

FIG. 1 is a diagram of a network 100 in which location data is collected from a plurality of mobile electronic devices 110 in accordance with some embodiments. The mobile devices 110 may be owned and used by different users in a crowd; the resulting location data is thus said to be crowd-sourced. Each mobile device 110 can receive a signal from an antenna 120 and thus is within range of the antenna 120. Colloquially, each mobile device 110 within range of the antenna 120 is said to be able to see the antenna 120. Each mobile device 110 calculates its location (e.g., its latitude and longitude coordinates) and transmits the calculated location to a computer system 140 in a message that also identifies the antenna 120.

For example, each mobile device 110 calculates its location using a Global Navigation Satellite System (GNSS), such as the Global Positioning System (GPS) or GLONASS. A respective mobile device 110 may be within range of multiple antennas 120 and may transmit a message to the computer system 140 providing its calculated location and identifying each the multiple antennas 120 that the mobile device 110 can see.

In some embodiments, the mobile devices 110 are cellular telephones and the antenna 120 is a cellular antenna (e.g., on a cell tower) operated by a cellular service provider. The region in which mobile devices 110 can see the cellular antenna 120 is called a cell. The identifier of the cellular antenna 120 is called a cell ID or base station ID (BSID). In other embodiments, the antenna 120 is a wireless access point (e.g., in a WiFi network).

The antenna 120 is coupled to the computer system 140 by a network or series of networks (e.g., the Internet) 130. Location data from the mobile devices 110 may be provided to the computer system 140 through the network 130. Alternately, the location data may be provided to the computer system 140 through another network connection separate from the antenna 120 and/or network 130. For example, if the antenna 120 is a cellular antenna, a mobile device 110 may upload its location data to the computer system 140 through the cellular antenna 120 or through a separate network connection (e.g., through a WiFi network). The mobile device 110 may upload its location data (along with the identifier of the antenna 120) while the mobile device 110 is within range of the antenna 120, or it may store its location data and the identifier of the antenna 120 and upload this information at a later time through a different network connection.

The computer system 140 includes a server 150 to communicate with the mobile devices 110, a data aggregation engine (DAE) 160 to aggregate the crowd-sourced location data from the mobile devices 110, and a database (DB) 170 to store the aggregated location data. The data aggregation engine 160 uses the location data to estimate the coverage region within which mobile devices 110 can see the antenna 120, and similarly estimates coverage regions for other antennas (e.g., other antennas operated by the same service provider as the antenna 120). In some embodiments, the data aggregation engine 160 down-samples the crowd-sourced location data, such that only a down-sampled subset of the location data is stored in the database 170. The down-sampled data is used to estimate the coverage region (e.g., the size of the cell) of the antenna 120. The server 150 may provide information about the estimated coverage region to mobile devices 110. For example, a mobile device 110 that is turned on when located in a particular coverage region may use the estimation location of the coverage region (e.g., the estimated center of the coverage region) as a starting point when determining its location using GPS (or another GNSS).

Figure 2A:
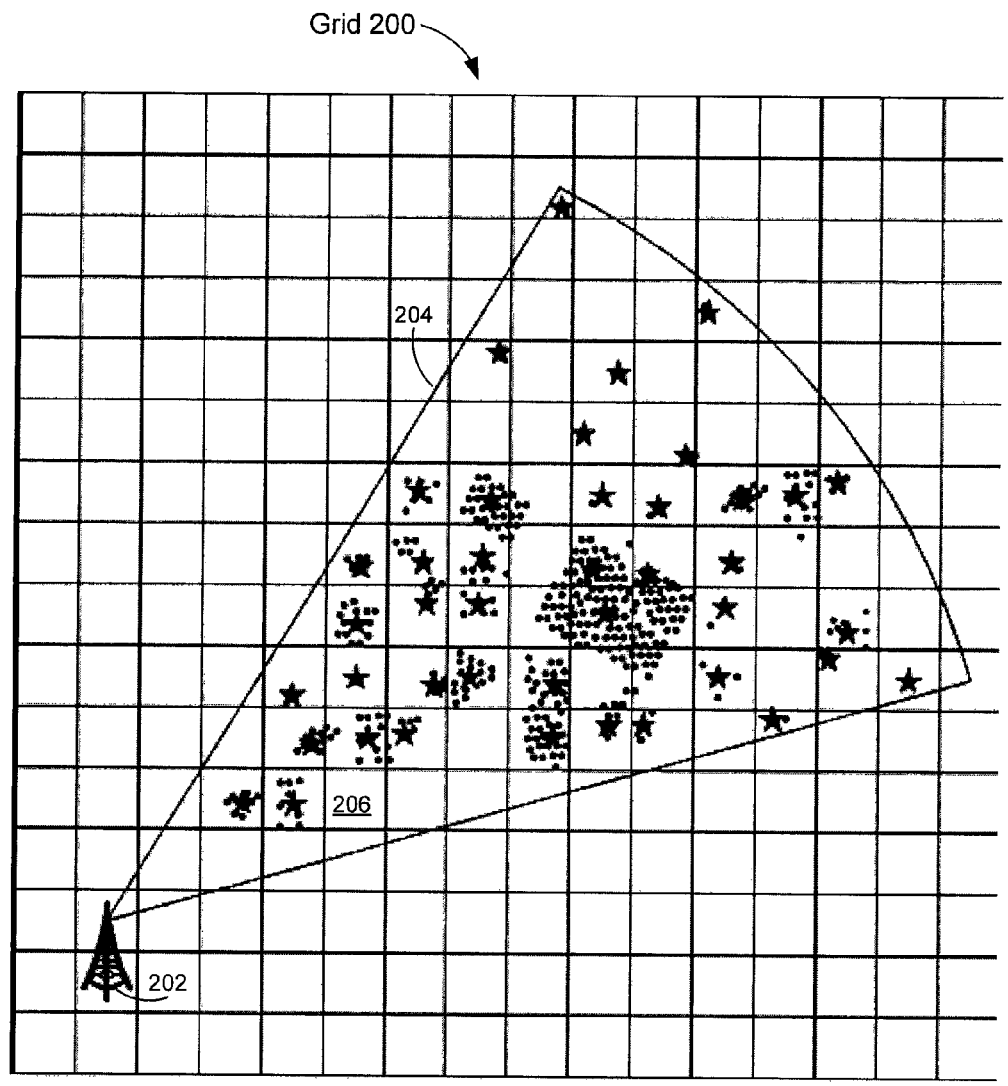
FIGS. 2A and 2B illustrate crowd-sourced location data for an antenna in accordance with some embodiments.

FIG. 2A illustrates crowd-sourced location data for an antenna (e.g., a cellular antenna) 202 in accordance with some embodiments. The antenna 202 is an example of the antenna 120 (FIG. 1). In this example, the antenna 202 is a directional antenna that, at least in principle, and assuming no obstructions, has a wedge-shaped coverage region 204. In practice, however, the extent of the coverage region 204 can deviate from its theoretical shape and can change over time. For example, a new structure might be built within the coverage region 204 that blocks signals from the antenna 202 and thus narrows the coverage region 204.

Each dot in FIG. 2A represents the location 210, at a particular point in time, of a mobile device 110 (FIG. 1) that can see the antenna 202. Multiple dots may correspond to different locations 210 of a single mobile device 110 at different times, and also to locations 210 of different mobile devices 110 at one or more points in time. The locations 210 are mapped onto a grid 200 of squares 206 (or other suitable shapes). This mapping is performed, for example, by the data aggregation engine 160 (FIG. 1). Each square 206 (or other suitable shape) is referred to as a district.

The data aggregation engine 160 (FIG. 1) down-samples the location data 210 for each district 206 for which location data 210 has been received. In some embodiments, the location data 210 for each district 206 is down-sampled to a single representative location 208. Representative locations 208 for respective districts 206 are shown as stars in FIG. 2A. If no crowd-sourced locations 210 are reported to the data aggregation engine 160 (FIG. 1) for a particular district 206, no representative location 208 is chosen for that district 206. The representative location 208 for a district 206 may be any location within the district 206. In some embodiments, the representative location 208 is determined by averaging the crowd-sourced locations 210 within the district 206 (e.g., by calculating the mean or median values of latitude and longitude coordinates for the locations 210 within the district 206). In other embodiments, the representative location 208 is the location 210 of a mobile device 110 (FIG. 1) within the district 206 (e.g., a location 210 chosen from among all reported locations 210 within the district 206). In still other embodiments, the representative location 208 is a random or arbitrary set of coordinates located within the district 206 (e.g., the center of the district 206). The representative location 208 thus may or may not be one of the locations 210. The data aggregation engine 160 stores the representative locations 208 (e.g., in a down-sampled location data table 500, FIG. 5A) and discards the locations 210 and any associated data (e.g., identifiers of mobile devices 110 associated with the locations 210). The down-sampled location data is accumulated over time, as more crowd-sourced locations 210 are reported to the data aggregation engine 160 (FIG. 1). For example, if a location 210 is reported in a district 206 for which no locations 210 had previously been reported, a representative location 208 is determined for the district 206.

By retaining only down-sampled location data, the amount of data to be stored and processed when determining estimated coverage regions is significantly reduced. Also, down-sampling protects the privacy of individual users of mobile devices 110, because data about the locations 210 of specific mobile devices 110 are not retained.

Figure 2B:
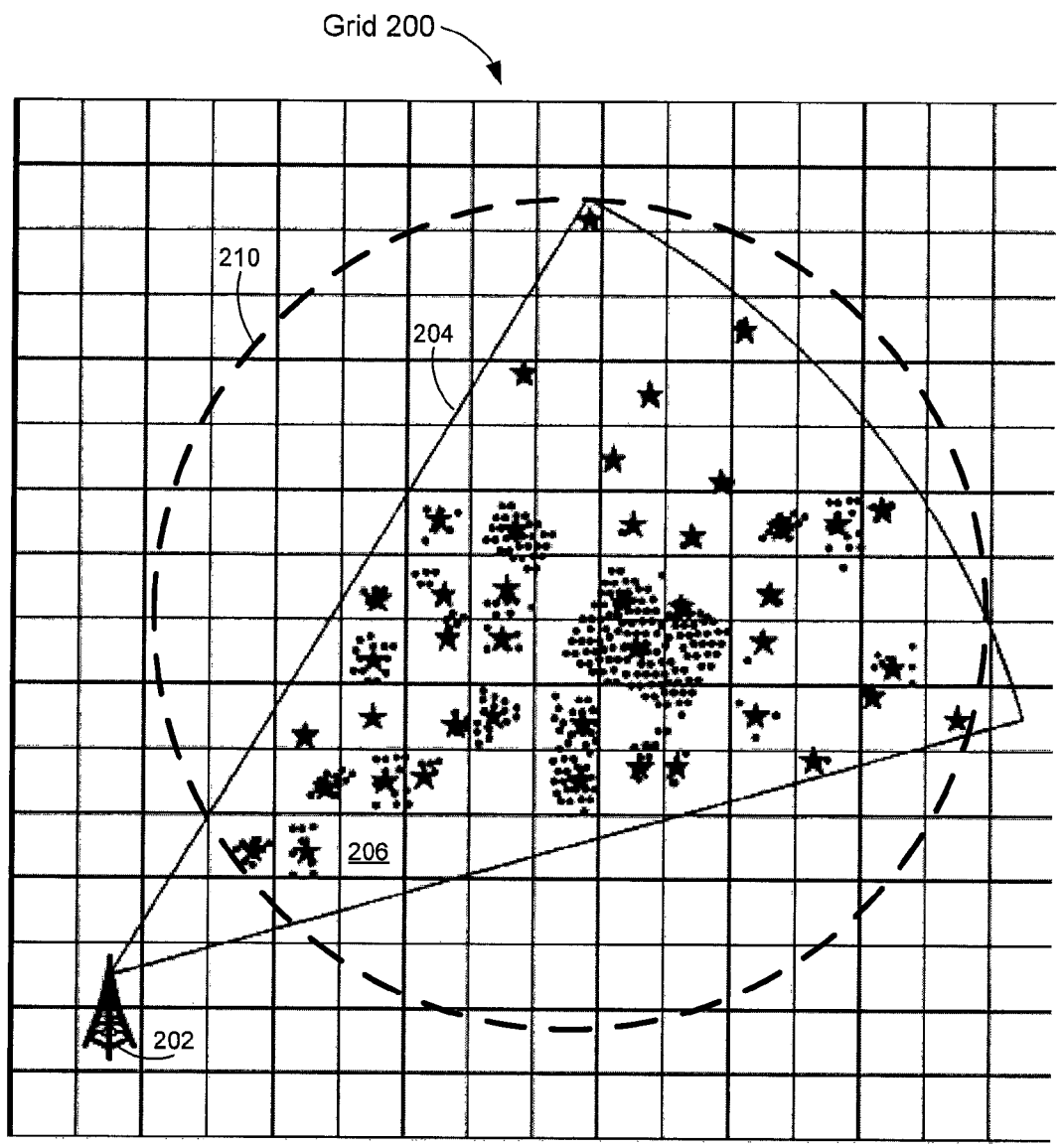

The data aggregation engine 160 (FIG. 1) uses the representative locations 208 to determine an approximate coverage region of the antenna 202. In some embodiments, the approximate coverage region is a circle 210, as shown in FIG. 2B in accordance with some embodiments. The circle 210 may be referred to as a sector; the center of the circle 210 is called the sector center and the radius of the circle 210 is called the sector radius. In some embodiments, the sector center is determined by averaging (e.g., taking the mean or median) of the latitude and longitude coordinates of the representative locations 208, and the sector radius is the minimum radius around the sector center that encompasses all representative locations 208 (or alternately, all representative locations 208 determined not to be outliers). In other embodiments, the circle 210 is the smallest circle that encompasses all representative locations 208 (or alternately, all representative locations 208 determined not to be outliers). Other methods of determining the circle 210 are possible. Furthermore, other shapes besides a circle may be used to approximate the coverage region 204.

In the example of FIGS. 2A and 2B, the crowd-sourced locations 210 are down-sampled to no more than a single representative location 208 per district 206. In other embodiments, however, the crowd-sourced locations 210 may be down-sampled to no more than a specified number (e.g., no more than two, or no more than three) representative locations per district 206.

Figure 3A:
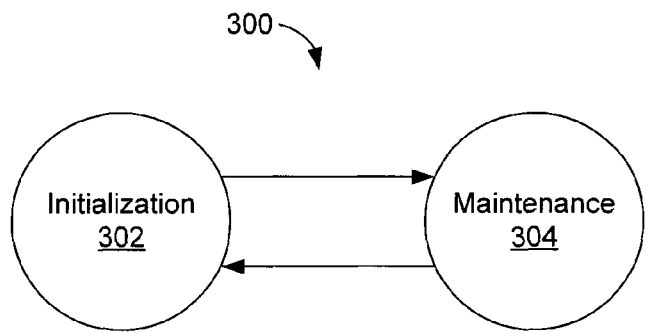
FIG. 3A is a state diagram illustrating states of the data aggregation engine of FIG. 1 in accordance with some embodiments.

In some embodiments, the data aggregation engine 160 (FIG. 1) operates in at least two states: initialization 302 and maintenance 304, as illustrated in the state diagram 300 of FIG. 3A. An example of the operation of these states is described with respect to FIG. 3B, which is a flowchart showing a method 320 of operating the data aggregation engine 160 in accordance with some embodiments. In the method 320, the data aggregation engine 160 accumulates (322) data: crowd-sourced locations 210 (FIGS. 2A-2B) are received from mobile devices 110 (FIG. 1) and down-sampled to representative locations 208 (FIGS. 2A-2B). The status of a variable "isConverged", which indicates whether a series of estimates for the approximate coverage region (e.g., sector 210, FIG. 2B) has converged, is checked (324). If isConverged=0 (324—No), indicating that convergence has not occurred, then the method 320 branches to operation 326, which corresponds to the initialization state 302 (FIG. 3A). If isConverged=1 (324—Yes), indicating that convergence has occurred, then the method 320 branches to operation 332, which corresponds to the maintenance state 304 (FIG. 3A). Operations 326, 328, and 330 thus correspond to the initialization state 302, while operations 332, 334, and 336 correspond to the maintenance state 304.

Initialization State

In the initialization state 302, the data aggregation engine 160 repeatedly estimates (326) the coverage region and checks (328) whether initialization convergence criteria have been satisfied. In some embodiments, the initialization convergence criteria include the following conditions:

$$numFixes \geq N_{thr} \qquad (1)$$

$$\frac{|r_k - r_{k-i}|}{r_k} \leq R_{thr}(i = 1, 2, \ldots, m) \qquad (2)$$

$$\frac{\|ct_k - ct_{k-i}\|}{r_k} \leq CD_{thr}(i = 1, 2, \ldots, m) \qquad (3)$$

where numFixes is the amount of crowd-sourced data (e.g., the number of locations 210, FIGS. 2A-2B), k is an index of the estimates calculated in operation 326, m is a predefined integer (e.g., m=5), $r_k$ is the $k^{th}$ estimate's radius, and $ct_k$ is the $k^{th}$ estimate's center position. Also, $N_{thr}$ is a predefined threshold amount of crowd-sourced data (e.g., 250 locations 210), $R_{thr}$ is a predefined percentage (e.g., 5%), and $CD_{thr}$ is a predefined percentage (e.g., 10%).

Condition (1) thus is satisfied if the number of crowd-sourced locations 210 is greater than or equal to a specified amount (e.g., 250 locations). Condition (2) thus is satisfied if the sector radius of the current estimate differs from the sector radii of a predefined number of preceding estimates (e.g., the previous five estimates) by no more than a specified percentage (e.g., 5%). (The current estimate is the estimate made during the current iteration of operation 326.) Condition (3) thus is satisfied if the distances between the location of the sector center of the current estimate and the locations of the sector centers of a predefined number of preceding estimates (e.g., the previous five estimates) are less than or equal to a specified percentage (e.g., 10%) of the sector radius of the current estimate. If conditions (1), (2), and (3) are met, then the initialization convergence criteria are satisfied (328—Yes) in accordance with some embodiments.

If the initialization convergence criteria are not satisfied (328—No), the method 320 returns to operation 322 and more location data is accumulated. The data aggregation engine 160 remains in the initialization state 302 (FIG. 3A): the isConverged variable is still equal to zero, and the method 320 therefore branches back to operations 326 and 328 during its next iteration.

If the initialization convergence criteria are satisfied (328—Yes), the data aggregation engine 160 outputs the current estimate of the coverage region as the approximate coverage region of the antenna 120 (FIG. 1) (e.g., antenna 202, FIGS. 2A-2B). The current estimate becomes (330) a reference referred to as the standard point. The standard point is recorded in a database (e.g., in a network almanac 530, FIG. 5B). For example, satisfaction of the initialization convergence criteria indicates that the circle 210 (FIG. 2B) has stabilized. The center and radius of the circle 210 are recorded in the database (e.g., in the network almanac 530, FIG. 5B). The value of the isConverged variable is set to one, which will cause the data aggregation engine 160 to enter the maintenance state 304 (FIG. 3A) during the next iteration of the method 320.

As part of establishing the standard point, the data aggregation engine 160 establishes upper and lower bounds associated with the standard point. Later estimates of the coverage region will be compared to the upper and lower bounds, to detect outliers. In some embodiments, the upper and lower bounds for later estimates are set in terms of ratios of the radii and centers of the later estimates to the radius and center of the standard point:

$$\frac{r_{new}}{r_{ref}} \leq R_{upper} \qquad (4)$$

$$\frac{r_{new}}{r_{ref}} \geq R_{lower} \qquad (5)$$

$$\frac{\|ct_{ref} - ct_{new}\|}{r_{ref}} \leq CD_{upper} \qquad (6)$$

$$\frac{\|ct_{ref} - ct_{new}\|}{r_{ref}} \geq CD_{lower} \qquad (7)$$

where $r_{new}$ is the radius of a new estimate (e.g., as calculated in operation 332), $r_{ref}$ is the radius of the standard point, $R_{upper}$ and $R_{lower}$ are predefined percentages (e.g., $R_{upper}$=120% and $R_{lower}$=60%), $ct_{new}$ is the center of a new estimate (e.g., as calculated in operation 332), $ct_{ref}$ is the center of the standard point, and $CD_{upper}$ and $CD_{lower}$ are predefined percentages (e.g., $CD_{upper}$=20% and $CD_{lower}$=0)

Maintenance State

After the standard point is set and the value of isConverged is set to one, the method 320 returns to data accumulation operation 322 and then to operation 324. Because isConverged equals one (324—Yes), the method 320 branches to operation 332 and the data aggregation engine 160 enters the maintenance state 304 (FIG. 3A). A new estimate of the coverage region is made (332) based on updated location data accumulated during operation 322.

In the maintenance state 304, the data aggregation engine 160 conducts multi-hypothesis testing on updated coverage region estimates to monitor any significant change in the estimated coverage region (e.g., the estimated cell size and location). Examples of significant changes include drastic growth or reduction of the coverage region (e.g., of the cell size) and drastic relocation of the coverage region. For example, when a difference between the radius or center of a new estimate and the standard point is larger than the corresponding upper bounds (e.g., violates condition (4) or (6)) or smaller than the lower bounds (e.g., violates condition (5) or (7)), an "incubation" process is triggered. Detection of outliers thus triggers the incubation process.

A time-domain observation window for the incubation process is set beforehand. For example, the observation window is a sliding window that traces back to a predefined number (e.g., 10) of upload instances from the newest upload instance, where an upload instance refers to receipt by the data aggregation engine 160 of a new crowd-sourced location 210 (FIGS. 2A-2B) in accordance with some embodiments. During the observation window a sequence of estimates of the coverage region is generated (332) and time-stamped as new upload instances occur. The data aggregation engine 160 counts the number of outliers (e.g., the number of estimates that violate one or more of conditions (4) through (7)) identified in the observation window. A determination is made (334) as to whether the number of outliers satisfies one or more criteria. If the one or more criteria are satisfied (334—Yes), incubation is said to succeed. Alternatively, if the one or more criteria are not satisfied (334—No), incubation fails.

For example, incubation succeeds (334—Yes) if both (or alternatively, at least one) of the following conditions are satisfied:

$$NC_{up} \geq NC_{upthr} \quad (8)$$

$$\frac{NC_{up}}{numTotal} \geq PC_{upthr} \quad (9)$$

where $NC_{up}$ is the number of estimates in the observation window that exceed an upper bound (e.g., that violate condition (4) or (6)), numTotal is the total number of upload instances within the observation window, $NC_{upthr}$ is a predefined number-of-occurrences threshold (e.g., 5), and $PC_{upthr}$ is a predefined percentage threshold (e.g., 60%). In this example, incubation succeeds if the number of estimates in the observation window that exceed an upper bound is greater than or equal to a specified number and a percentage of estimates in the observation window that exceed an upper bound is greater than or equal to a specified value.

Incubation also succeeds (334—Yes) if both (or alternatively, at least one) of the following conditions are satisfied:

$$NC_{dn} \geq NC_{dnthr} \quad (10)$$

$$\frac{NC_{dn}}{numTotal} \geq PC_{dnthr} \quad (11)$$

where $NC_{dn}$ is the number of estimates (e.g., 10) in the observation window that violate a lower bound (e.g., that violate condition (5) or (7)), $N_{Cdnthr}$ is a predefined number-of-occurrences threshold (e.g., 5), and $PC_{dnthr}$ is a predefined percentage threshold (e.g., 60%). In this example, incubation thus succeeds if the number of estimates in the observation window that violate a lower bound is greater than or equal to a specified number and a percentage of estimates in the observation window that violate a lower bound is greater than or equal to a specified value.

If incubation fails (334—No), the method 320 continues to iterate in the maintenance state 304 (FIG. 3A). If incubation succeeds (334—Yes), the isConverged variable is set equal to 0. The method 320 returns to operation 322 and then branches from operation 324 to operation 326, thereby re-entering the initialization state 302 (FIG. 3A). A new initialization is therefore performed after incubation succeeds. Upon completion of the new initialization period, the data aggregation engine 160 provides a new standard point (330) and then returns to the maintenance state 304 (FIG. 3A), in accordance with the logic of the method 320.

The combined use of initialization and incubation periods reduces the susceptibility of the data aggregation engine 160 to attack by hostile devices reporting false cell coverage: the data aggregation engine 160 does not immediately produce a new standard point in response to bogus location data reported by a hostile device.

Figure 3B:
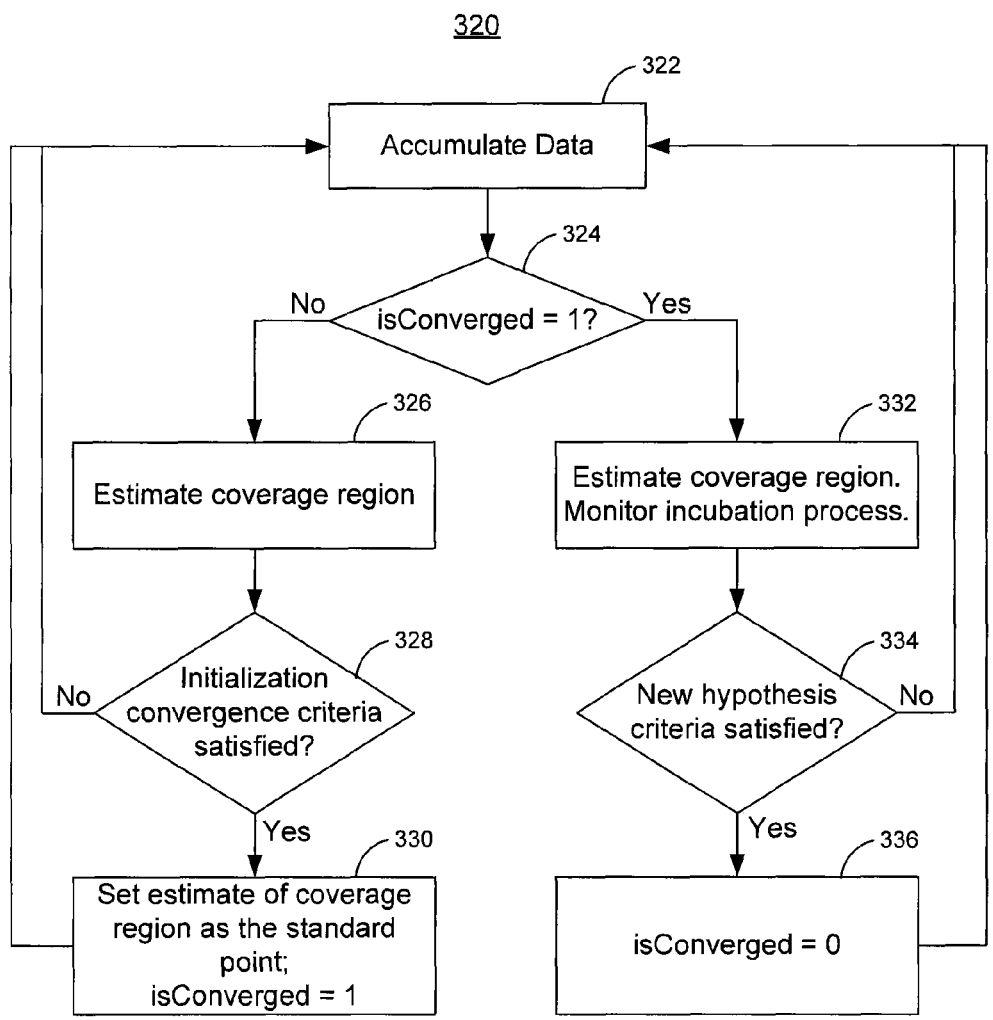
FIG. 3B is a flowchart showing a method of operating the data aggregation engine of FIG. 1 in accordance with some embodiments.
Figure 4:
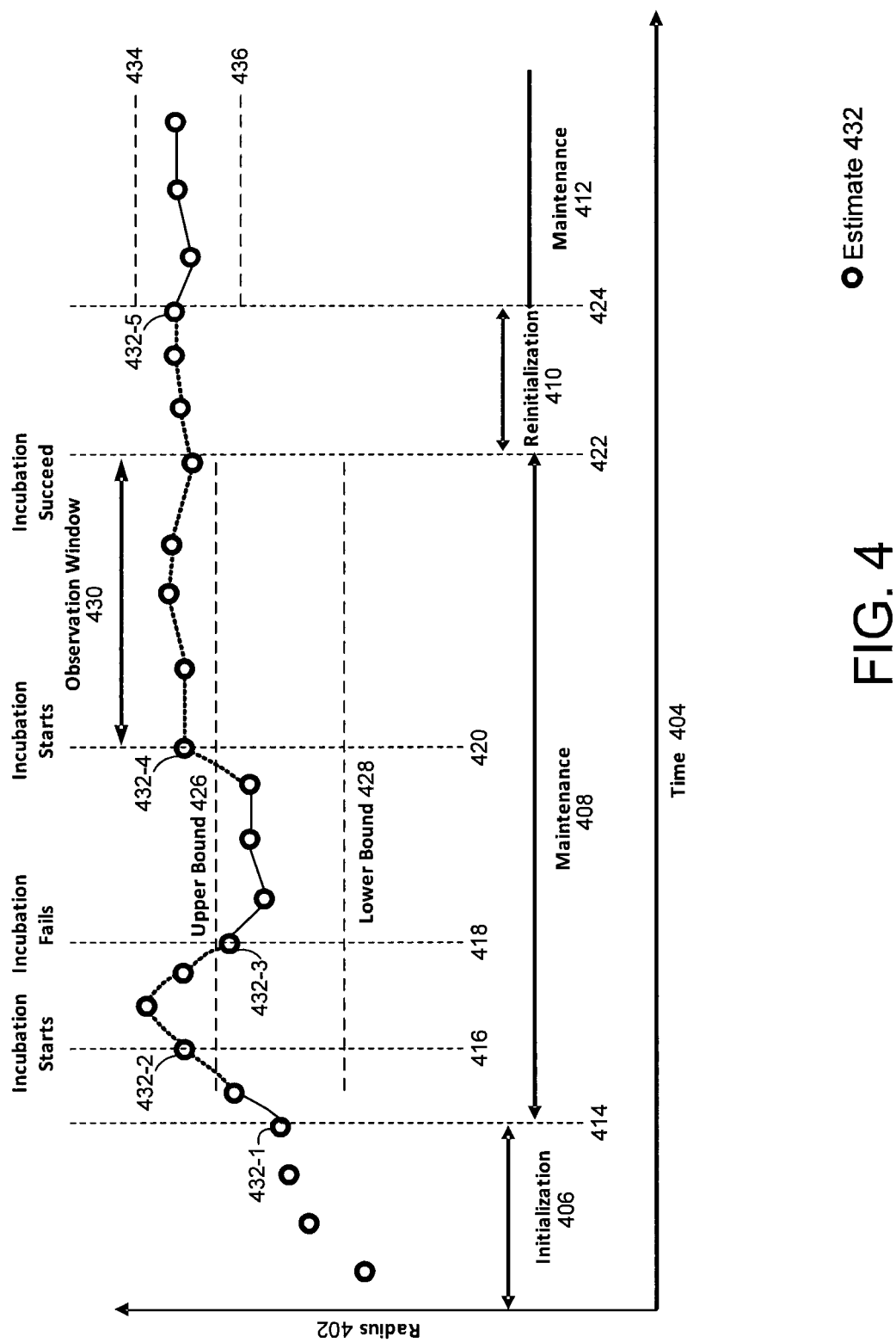
FIG. 4 illustrates an example of successive coverage region estimates calculated using the method of FIG. 3B in accordance with some embodiments.

FIG. 4 illustrates an example of successive coverage region estimates calculated using the method 320 (FIG. 3B) in accordance with some embodiments. The x-axis of FIG. 4 is time 404 and the y-axis is the sector radius 402 of an approximate coverage region 210 (FIG. 2B) as estimated by the data aggregation engine 160 (e.g., during operations 326 and 332 of the method 320, FIG. 3B). The data aggregation engine 160 makes successive estimates 432 of the sector radius. (Corresponding estimates of the sector center are not shown for simplicity.) An initial series of estimates 432 is made during a first initialization period 406, during which the data aggregation engine 160 is in the initialization state 302 (FIG. 3B). At a time 414 the data aggregation engine 160 determines that the initialization convergence criteria (e.g., conditions (1)-(3)) have been satisfied. In response to this determination, the estimate 432-1 is set as the standard point (e.g., is provided to the network almanac 530, FIG. 5B), upper and lower bounds 426 and 428 (e.g., as defined by conditions (4)-(7)) are established, the initialization period 406 ends, and the data aggregation engine 160 transitions to the maintenance state 304 (FIG. 3B), thus beginning a maintenance period 408.

An estimate 432-2 at a time 416 violates the upper bound 426 (e.g., violates condition (4)), triggering incubation. Incubation fails at a time 418, when estimate 432-3 falls within the upper and lower bounds 426 (thereby indicating, for example, that conditions (8) and (9) were not satisfied). Because incubation fails at time 418, the maintenance state 408 continues.

An estimate 432-4 at a time 420 violates the upper bound 426, again triggering incubation. Estimates 432 generated during an observation window 430 for the incubation process are determined to satisfy the incubation conditions (e.g., conditions (8)-(9)). As a result, a determination is made at time 422 that incubation has succeeded. The maintenance period 408 ends and a new initialization (i.e., re-initialization) period 410 begins. Re-initialization 410 ends at a time 424, when a new standard point 432-5 is set. Upper and lower bounds 434 and 436 corresponding to the new standard point 432-5 are determined and a new maintenance state 412 begins.

Figure 5A:
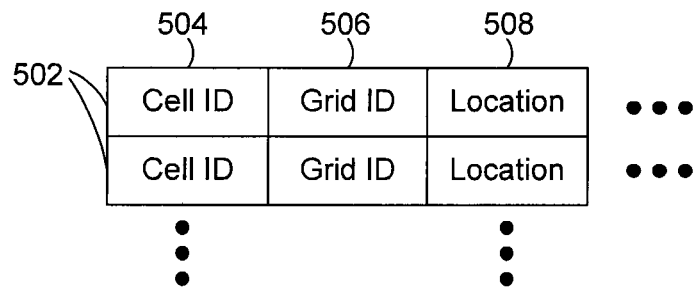
FIG. 5A is a data structure of a down-sampled location data table in accordance with some embodiments.

FIG. 5A illustrates a table 500 for storing down-sampled location data in accordance with some embodiments. The table 500 is situated, for example, in memory in the data aggregation engine 160 or in the database 170 (FIG. 1). Each row 502 corresponds to a particular district (e.g., a district 206, FIGS. 2A-2B) in a grid (e.g., a grid 200, FIGS. 2A-2B) associated with a coverage region of a particular antenna (e.g., an antenna 202, FIGS. 2A-2B). Each row 502 includes a field 504 that stores an antenna identifier (e.g., a cell ID or base station ID), a field 506 to store a district identifier (e.g., coordinates of the district in a grid), and a field 508 to store a representative location (e.g., a representative location 208, FIGS. 2A-2B) in the district, as determined by down-sampling. The table 500 may include additional fields. The data aggregation engine 160 updates the table 500 when location data is aggregated and down-sampled, and accesses the table 500 when generating coverage region estimates (e.g., in accordance with the method 320, FIG. 3B).

Figure 5B:
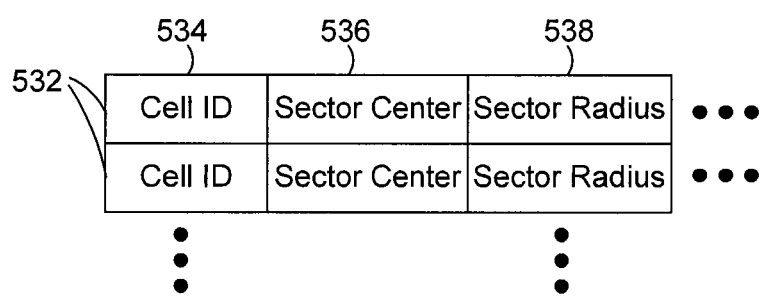
FIG. 5B is a data structure of a network almanac in accordance with some embodiments.

FIG. 5B illustrates a data structure of a network almanac 530 for storing data regarding approximate coverage regions (e.g., as estimated in the method 320, FIG. 3B). In some embodiments, the network almanac 530 is stored in the database 170 (FIG. 1). Each row 532 corresponds to a particular antenna (e.g., an antenna 202, FIGS. 2A-2B) and includes a field 534 that stores an antenna identifier (e.g., a cell ID or base station ID), a field 536 that stores the sector center (e.g., as specified by latitude and longitude coordinates) of the standard point for the antenna identified in field 534, and a field 538 that stores the sector radius of the standard point for the antenna identified in field 534. The network almanac 530 may include other fields as well. In some embodiments, the network almanac 530 is maintained by a service provider. A device in the service provider's network may query the table 530 by specifying an antenna identifier (e.g., by sending the antenna identifier to the computer system 140, FIG. 1); in response, the coverage region data in fields 536 and 538 is provided to the device.

Figure 6A:
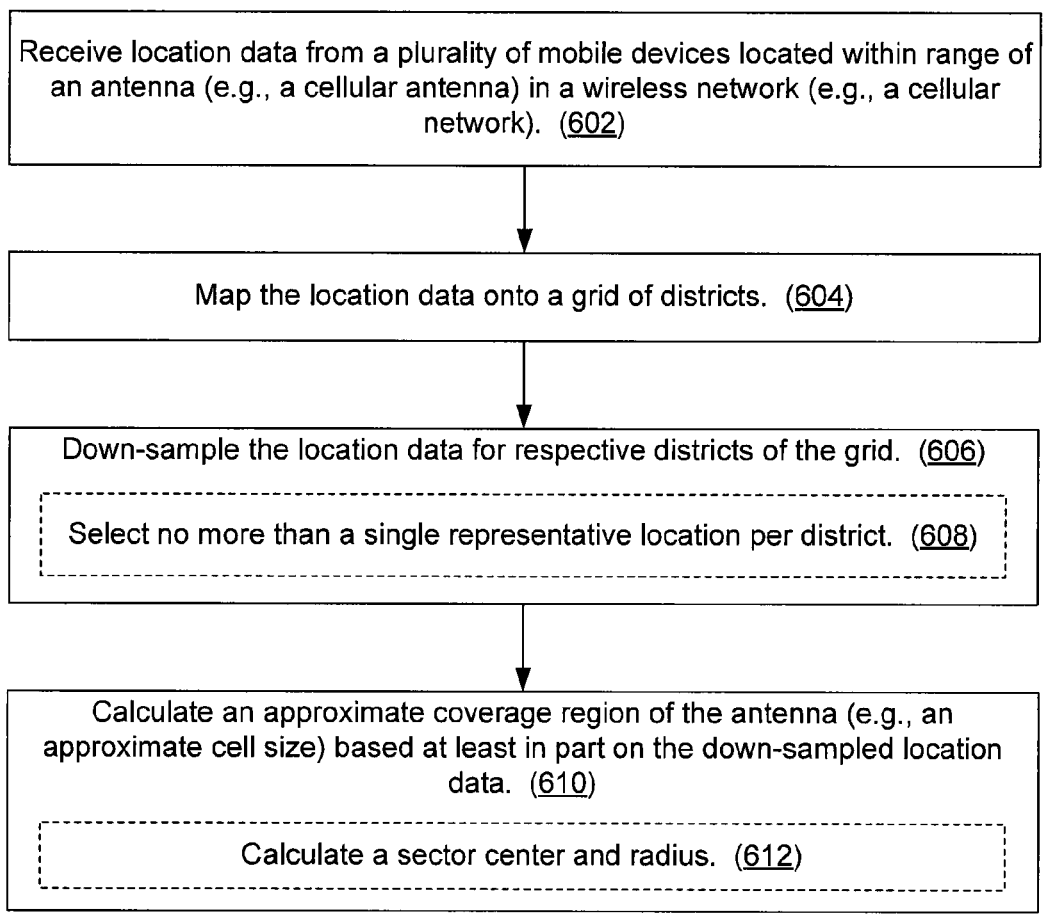
FIG. 6A is a flowchart illustrating a method of estimating wireless network coverage in accordance with some embodiments.

FIG. 6A is a flowchart illustrating a method 600 of estimating wireless network coverage in accordance with some embodiments. The method 600 is performed, for example, in a computer system 140 (FIG. 1) (e.g., in the data aggregation engine 160 of the computer system 140, FIG. 1).

Location data is received (602) from a plurality of mobile devices (e.g., devices 110, FIG. 1) located within range of an antenna (e.g., an antenna 120, FIG. 1, or 202, FIGS. 2A-2B) in a wireless network. In some embodiments, the antenna is a cellular antenna and the wireless network is a cellular network.

The location data is mapped (604) onto a grid of districts (e.g., the grid 200 of districts 206, FIGS. 2A-2B).

The location data for respective districts of the grid is down-sampled (606). In some embodiments, no more than a single representative location (e.g., representative location 208, FIGS. 2A-2B) is selected (608) per district. The representative location for a district may be selected, for example, by averaging coordinates of the location data for the district, by choosing a location from a group of locations specified by the location data for the district, or by choosing an arbitrary location within the district (e.g., the center of the district).

An approximate coverage region of the antenna (e.g., an approximate cell size) is calculated (610) based at least in part on the down-sampled location data. In some embodiments, a sector center and radius (e.g., of a circle/sector 210, FIGS. 2A-2B) are calculated (612). In some embodiments, the approximate coverage region is set as the standard point and made available in the network almanac 530 (FIG. 5B).

In some embodiments, another approximate coverage region of the antenna (distinct from the approximate coverage region calculated in operation 610) is received (e.g., from a third party) and used along with the approximate coverage region from operation 610 to determine a final approximate coverage region that is made available in the network almanac 530 (FIG. 5B). For example, the two approximate coverage regions are averaged to generate the final approximate coverage region.

Figure 6B:
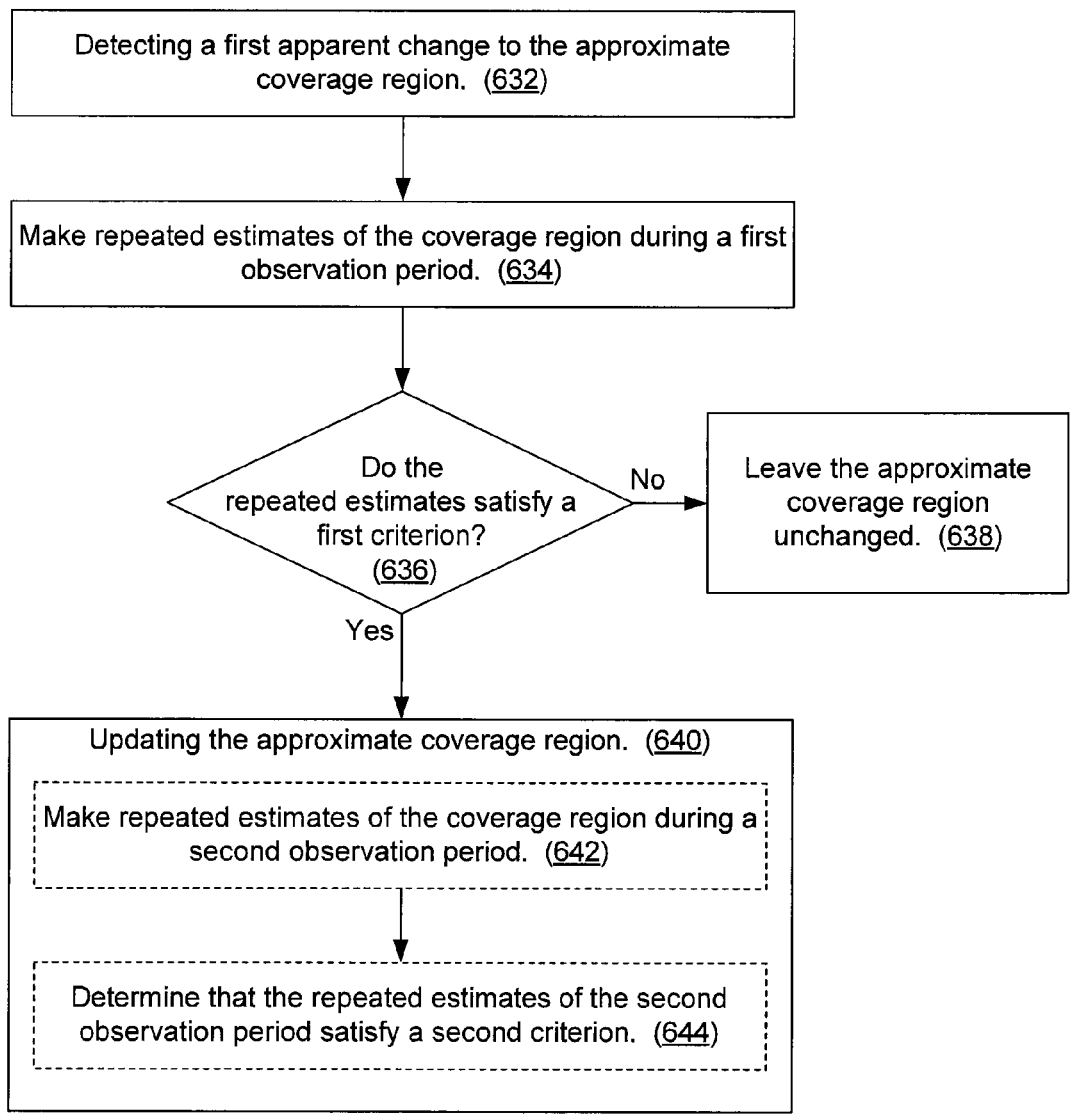
FIG. 6B is a flowchart illustrating a method of updating estimated wireless network coverage in accordance with some embodiments.

FIG. 6B is a flowchart illustrating a method 630 of updating estimated wireless network coverage in accordance with some embodiments. In some embodiments, the method 630 is performed along with the method 600 (FIG. 6A). The method 630 is performed, for example, in a computer system 140 (FIG. 1) (e.g., in the data aggregation engine 160 of the computer system 140, FIG. 1).

A first apparent change to an approximate coverage region (e.g., the approximate coverage region calculated in operation 610, FIG. 6A) is detected (632). For example, it is determined that a new estimate of the approximate coverage region violates upper or lower bounds (e.g., one or more of conditions (4)-(7)) set with regard to the standard point.

In response to detecting the first apparent change, repeated estimates of the coverage region are made (634) during a first observation period (e.g., during an observation window 430 of an incubation process, FIG. 4). A determination is made (636) as to whether the repeated estimates satisfy a first criterion (e.g., whether the conditions (8)-(9) or (10)-(11) are satisfied).

If the repeated estimates do not satisfy the first criterion (636—No), the approximate coverage region is left unchanged (638). For example, incubation ends and the data aggregation engine 160 remains in its maintenance state 304 (FIG. 3A).

If the repeated estimates satisfy the first criterion (636—Yes), the approximate coverage region is updated (640). In some embodiments, updating the approximate coverage region includes making (642) repeated estimates of the coverage region during a second observation period (e.g., during the re-initialization period 410, FIG. 4) and determining (644) that the repeated estimates of the second observation period satisfy a second criterion. In some embodiments, the second criterion is that conditions (1)-(3) are satisfied.

While the methods 600 and 630 (FIGS. 6A and 6B) include a number of operations that appear to occur in a specific order, it should be apparent that the methods 600 and 630 can include more or fewer operations, which can be executed serially or in parallel. An order of two or more operations may be changed and two or more operations may be combined into a single operation. The methods 600 and 630 also may be performed repeatedly (e.g., in accordance with the method 320, FIG. 3B).

Figure 7:
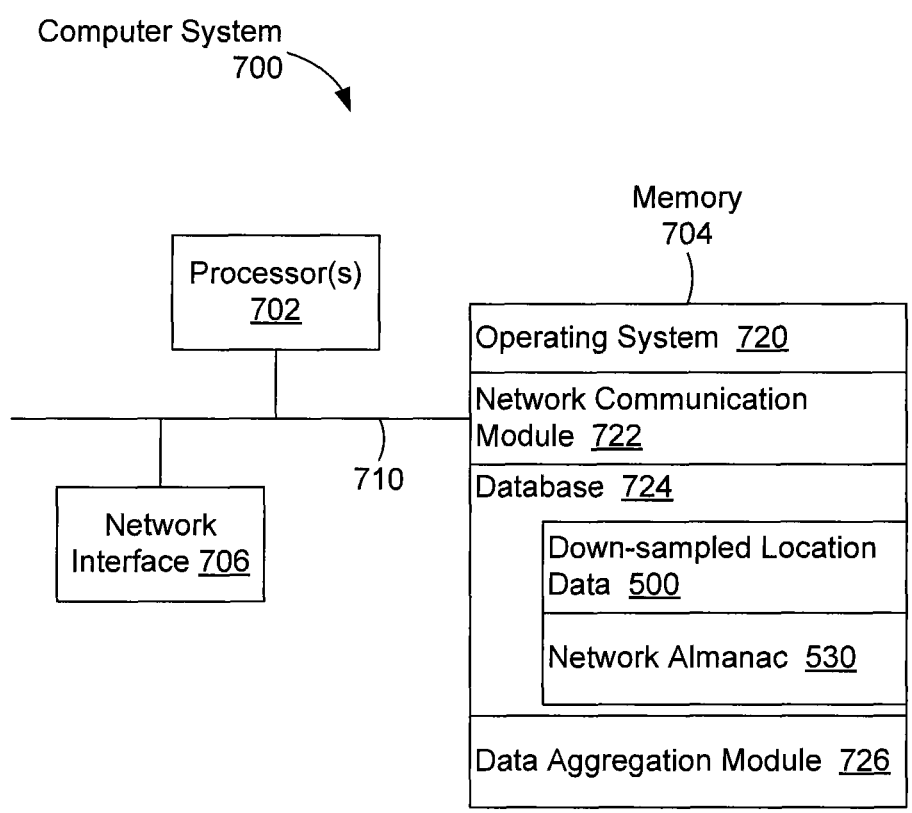
FIG. 7 is a block diagram illustrating a computer system in accordance with some embodiments.

FIG. 7 is a block diagram illustrating a computer system 700 in accordance with some embodiments. The computer system 700 is an example of the computer system 140 (FIG. 4) and includes one or more processors 702, one or more network or other communications interfaces 706, memory 704, and one or more communication buses 710 for interconnecting these components. The computer system 700 optionally may include a user interface (not shown), which may include a display device, a keyboard, and/or a mouse or other user input device.

Memory 704 includes non-volatile memory, such as one or more magnetic disk storage devices, optical disk storage devices, flash memory devices, or other non-volatile solid state storage devices. Memory 704 may optionally include one or more storage devices remotely located from the processor(s) 702 and one or more storage media that are removable from the computer system 700. The non-volatile memory of memory 704 constitutes a non-transitory computer-readable medium. In some embodiments, memory 704 (e.g., the non-volatile memory of memory 704) stores the following programs, modules and data structures, or a subset thereof:

- an operating system 720 that includes procedures for handling various basic system services and for performing hardware dependent tasks;
- a network communication module 722 that is used for connecting the computer system 700 to other computing devices (e.g., mobile devices 110, FIG. 1) via the one or more communication network interfaces 706 and one or more communication networks (e.g., network 130, FIG. 1);

a database 724 (e.g., the database 170, FIG. 1) to store location data and data on approximate coverage regions; and a data aggregation module 726 for aggregating and down-sampling crowd-sourced location data and using the data to estimate coverage regions.

In some embodiments, the database 724 includes the down-sampled location data table 500 (FIG. 5A) and the network almanac 530 (FIG. 5B). In some embodiments, the data aggregation module 726 is stored in the non-volatile memory of memory 704 and includes instructions corresponding to all or a portion of the methods 320 (FIG. 3B), 600 (FIG. 6A), and/or 630 (FIG. 6B): when executed by the one or more processors 702, the instructions cause the computer system 700 to perform all or a portion of the methods 320 (FIG. 3B), 600 (FIG. 6A), and/or 630 (FIG. 6B). Furthermore, memory 704 may store additional modules and data structures not described above.

FIG. 7 is intended more as a functional description of the various features which may be present in a computer system (e.g., a set of servers) than as a structural schematic diagram. In practice, and as recognized by those of ordinary skill in the art, items shown separately could be combined and some items could be separated. For example, some items shown separately in FIG. 7 could be implemented on a single computer (e.g., a single server) and single items could be implemented by one or more computers (e.g., one or more servers).

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A method of estimating wireless network coverage, the method comprising:
   receiving location data from a plurality of mobile devices located within range of an antenna in a wireless network;
   mapping the location data onto a grid of districts;
   in each district of a plurality of the districts, down-sampling the location data for the district, the down-sampling comprising:
      for each district of the plurality of the districts, storing no more than a specified number of one or more representative locations for the district and discarding all location data for the district that is distinct from the one or more representative locations for the district; and
   calculating an approximate coverage region of the antenna based at least in part on the down-sampled location data.

2. The method of claim 1, wherein the antenna comprises a cellular antenna, and the approximate coverage region approximates a cell size of a cell corresponding to the cellular antenna.

3. The method of claim 1, wherein the location data from the plurality of mobile devices comprise location coordinates determined using a Global Navigation Satellite System.

4. The method of claim 1, wherein calculating the approximate coverage region comprises calculating a center of a sector.

5. The method of claim 4, wherein calculating the approximate coverage region further comprises calculating a radius of the sector.

6. The method of claim 1, wherein the districts comprise square regions in the grid.

7. The method of claim 1, wherein the down-sampling comprises selecting no more than a single representative location per district.

8. The method of claim 7, wherein the single representative location of a respective district has coordinates determined by averaging coordinates of the location data for the respective district.

9. The method of claim 7, wherein the single representative location of a respective district is selected from a group of locations specified by the location data for the respective district.

10. The method of claim 7, wherein the single representative location of a respective district is the location of a center of the respective district.

11. The method of claim 1, wherein the approximate coverage region is a first approximate coverage region, the method further comprising:
    receiving a second approximate coverage region of the antenna; and
    averaging the first approximate coverage region with the second approximate coverage region.

12. The method of claim 1, further comprising:
    detecting a first apparent change to the approximate coverage region;
    in response to the detecting, making repeated estimates of the approximate coverage region during a first observation period;
    determining whether the repeated estimates satisfy a first criterion; and
    in response to determining that the repeated estimates satisfy the first criterion, updating the approximate coverage region.

13. The method of claim 12, wherein updating the approximate coverage region comprises:
    making repeated estimates of the approximate coverage region during a second observation period; and
    determining that the repeated estimates of the second observation period satisfy a second criterion.

14. The method of claim 12, further comprising:
    detecting a second apparent change to the approximate coverage region;
    in response to detecting the second apparent change, making repeated estimates of the approximate coverage region during a second observation period;
    determining that the repeated estimates of the second observation period do not satisfy the first criterion; and
    in response to determining that the repeated estimates of the second observation period do not satisfy the first criterion, leaving the approximate coverage region unchanged.

15. A computer system, comprising:
    a network interface to receive location data from a plurality of mobile devices located within range of an antenna in a wireless network;
    one or more processors; and
    memory storing one or more programs configured to be executed by the one or more processors, the one or more programs comprising:
       instructions to map the location data onto a grid of districts;
       instructions to down-sample, in each district of a plurality of the districts, the location data for the district, comprising instructions to store, for each district of the plurality of the districts, no more than a specified number of one or more representative locations for the district and instructions to discard, for each district of the plurality of the districts, all location data for the district that is distinct from the one or more representative locations for the district; and instructions to calculate an approximate coverage region of the antenna based at least in part on the down-sampled location data.

16. The computer system of claim 15, wherein the instructions to down-sample the location data comprise instructions to select no more than a single representative location per district.

17. The computer system of claim 15, wherein:
the antenna comprises a cellular antenna; and
the instructions to calculate the approximate coverage region comprise instructions to calculate an approximate cell size of a cell corresponding to the cellular antenna.

18. A non-transitory computer-readable storage medium storing one or more programs configured to be executed by a computer system comprising one or more processors, the one or more programs comprising:

instructions to map location data from a plurality of mobile devices located within range of an antenna in a wireless network onto a grid of districts;

instructions to down-sample, in each district of a plurality of the districts, the location data for the district, comprising instructions to store, for each district of the plurality of the districts, no more than a specified number of one or more representative locations for the district and instructions to discard, for each district of the plurality of the districts, all location data for the district that is distinct from the one or more representative locations for the district; and instructions to calculate an approximate coverage region of the antenna based at least in part on the down-sampled location data.

19. The computer-readable storage medium of claim 18, wherein the instructions to down-sample the location data comprise instructions to select no more than a single representative location per district.

20. The computer-readable storage medium of claim 18, wherein:
the antenna comprises a cellular antenna; and
the instructions to calculate the approximate coverage region comprise instructions to calculate an approximate cell size of a cell corresponding to the cellular antenna.

* * * * *